US009903524B2

(12) United States Patent
Lange et al.

(10) Patent No.: US 9,903,524 B2
(45) Date of Patent: Feb. 27, 2018

(54) HANGER SYSTEM

(71) Applicant: ERICO International Corporation, Solon, OH (US)

(72) Inventors: Ethan Lange, Solon, OH (US); Colin Andrews, Solon, OH (US); Paul A. Hart, Warren, OH (US)

(73) Assignee: ERICO INTERNATIONAL CORPORATION, Solo, OH (US)

( * ) Notice: Subject to any disclaimer, the term of this patent is extended or adjusted under 35 U.S.C. 154(b) by 0 days.

(21) Appl. No.: 14/997,080

(22) Filed: Jan. 15, 2016

(65) Prior Publication Data

US 2016/0208979 A1    Jul. 21, 2016

Related U.S. Application Data

(60) Provisional application No. 62/104,951, filed on Jan. 19, 2015.

(51) Int. Cl.
| | |
|---|---|
| *F16L 59/135* | (2006.01) |
| *F16L 3/11* | (2006.01) |
| *F16L 3/10* | (2006.01) |

(52) U.S. Cl.
CPC .............. *F16L 59/135* (2013.01); *F16L 3/11* (2013.01); *F16L 3/1008* (2013.01)

(58) Field of Classification Search
CPC ... F16L 3/10; F16L 3/11; F16L 59/135; F16L 3/1091; E21F 17/02
USPC .................................................... 248/62, 58
See application file for complete search history.

(56) References Cited

U.S. PATENT DOCUMENTS

| | | | | |
|---|---|---|---|---|
| 2,339,564 | A | | 1/1944 | Goldberg et al. |
| 2,671,625 | A | * | 3/1954 | Buckley ..................... F16L 3/11 248/58 |
| 2,714,497 | A | * | 8/1955 | Denis ........................ F16L 3/11 248/62 |
| 3,415,474 | A | * | 12/1968 | Kindorf ............... F16L 59/135 248/62 |
| 3,623,686 | A | * | 11/1971 | Dupuis ..................... F16L 3/11 248/60 |
| 3,652,045 | A | * | 3/1972 | Hirt .......................... F16L 3/11 248/62 |

(Continued)

OTHER PUBLICATIONS

Caddy Fixing, Fastening & Support Products Catalog; pp. 66-74 clevis hangers; Copyright 2006, 2015; ERICO International Corporation.

(Continued)

*Primary Examiner* — Kimberly Wood
(74) *Attorney, Agent, or Firm* — Quarles & Brady LLP (57) ABSTRACT

Embodiments of the invention provide a clevis hanger system. A clevis top can include a hanging portion, a first leg with a first hole, and a second leg with a second hole. A clevis bottom can include a saddle, a third leg with a third hole, and a fourth leg with a fourth hole. To secure the clevis top to the clevis bottom and define an internal area to receive pipe, the first hole can be aligned with the third hole and the second hole can be aligned with the fourth hole, and a fastener can be received through the first hole, the second hole, the third hole, and the fourth hole. At least one of the first hole and the third hole can be surrounded by a first annular flange. At least one of the second hole and the fourth hole can be surrounded by a second annular flange.

14 Claims, 10 Drawing Sheets

(56) References Cited

U.S. PATENT DOCUMENTS

| | | | |
|---|---|---|---|
| 3,653,618 A * | 4/1972 | Kindorf | F16L 59/135 248/58 |
| 4,047,683 A | 9/1977 | Takeuchi | |
| 4,487,387 A | 12/1984 | Heath | |
| 4,488,695 A | 12/1984 | Rumble | |
| 4,489,908 A | 12/1984 | Rumble | |
| 4,524,935 A | 6/1985 | Rumble | |
| 4,550,890 A | 11/1985 | Redman et al. | |
| 4,714,218 A | 12/1987 | Hungerford, Jr. | |
| 4,795,115 A | 1/1989 | Breeden, Jr. et al. | |
| 4,934,634 A | 6/1990 | Breeden, Jr. et al. | |
| 5,009,386 A | 4/1991 | Berger et al. | |
| 5,082,216 A | 1/1992 | Roth | |
| 5,192,039 A | 3/1993 | Williams | |
| 5,219,427 A | 6/1993 | Harris | |
| 5,381,833 A | 1/1995 | Cummings et al. | |
| 5,542,631 A | 8/1996 | Bruno | |
| 5,848,770 A | 12/1998 | Oliver et al. | |
| 5,924,655 A | 7/1999 | Rinderer | |
| 5,944,365 A | 8/1999 | Kizler et al. | |
| 6,138,960 A | 10/2000 | Carbonare et al. | |
| 6,224,025 B1 | 5/2001 | Alvarez | |
| 7,090,174 B2 | 8/2006 | Korczak et al. | |
| 7,207,527 B2 | 4/2007 | Opperthauser | |
| 7,284,728 B2 | 10/2007 | Connolly | |
| 7,546,986 B2 | 6/2009 | Kim | |
| 7,677,505 B2 | 3/2010 | Deichman | |
| 7,793,893 B2 | 9/2010 | Opperthauser | |
| 8,038,105 B2 | 10/2011 | Deichman | |
| 8,297,561 B1 | 10/2012 | Montplaisir et al. | |
| 8,322,662 B2 | 12/2012 | Heath et al. | |
| 8,339,329 B2 * | 12/2012 | Shen | H01Q 1/125 343/718 |
| 8,398,035 B2 | 3/2013 | Cazalet | |
| 8,833,705 B2 | 9/2014 | Bragagna et al. | |
| 9,115,827 B2 | 8/2015 | Heath et al. | |
| 2003/0102412 A1 * | 6/2003 | Miescher | F16L 3/133 248/62 |
| 2009/0321587 A1 | 12/2009 | Thackeray | |
| 2010/0038494 A1 | 2/2010 | Osborn et al. | |
| 2011/0084178 A1 * | 4/2011 | Wiedner | F16L 3/11 248/62 |
| 2011/0239430 A1 * | 10/2011 | Merrill | B60B 35/04 29/402.03 |
| 2012/0318934 A1 | 12/2012 | Thomas | |
| 2013/0126681 A1 * | 5/2013 | Greenfield | F16L 3/11 248/62 |

OTHER PUBLICATIONS

Eaton, Copyright 2016, [online], <http://www.cooperindustries.com/content/public/en/b-line/products/seismic-bracing/rigid-bracing/_1CBS.html>.

* cited by examiner

HANGER SYSTEM

RELATED APPLICATIONS

This application claims priority under 35 U.S.C. § 119 to U.S. Provisional Patent Application No. 62/104,951 filed on Jan. 19, 2015, the entire contents of which are incorporated herein by reference.

BACKGROUND

Some conventional hanger systems for hanging pipe can include one or more clevis hangers. A conventional clevis hanger can include a clevis top and a clevis bottom, each formed from a shaped strip of stamped steel. The clevis bottom can be shaped to include a saddle shaped to receive the pipe with legs extending upward from the saddle. The clevis top can be shaped to include a central support feature for connecting the clevis top to a hanging rod, with legs extending downward from the support feature. To allow the pipe to be supported by the hanging rod, the clevis top can be secured to the hanging rod, and the legs of the clevis top can be disposed to overlap with the legs of the clevis bottom, so that holes on each one of the legs are aligned. A bolt can then be inserted through the holes and anchored with a threaded nut, in order to secure the clevis top to the clevis bottom.

In different installations, clevis hangers may need to support significant loads. Under sufficiently large loads, however, conventional designs can suffer from unwanted deformation of the clevis top or the clevis bottom, or outright failure of the clevis top or the clevis bottom. For example, under a sufficiently large load, stresses at the various leg holes can lead to stress failure of the clevis top or the clevis bottom, including complete tearing of the steel at the holes used to connect the clevis top to the clevis bottom.

Some conventional hanger systems can also include pipe shields, as may be useful, for example, to support insulated pipe on a clevis hanger. In some conventional arrangements, a pipe shield can be designed to be welded or riveted onto a clevis bottom of a clevis hanger so that the pipe shield is interposed between the clevis bottom and the supported pipe. Installation of pipe shields with riveting or welding can be time-consuming, however, and may be difficult to execute at installation sites. In other conventional arrangements, a pipe shield can simply be placed onto a clevis bottom, without welding or fasteners. However, this may result in the pipe shield shifting into an undesired orientation or falling away from the clevis hanger, including during installation of pipe to be supported by the clevis hanger.

SUMMARY

Some embodiments of the invention provide a clevis hanger system for hanging a pipe. A clevis top can include a hanging portion, a first leg with a first hole, and a second leg with a second hole. A clevis bottom can include a saddle, a third leg with a third hole, and a fourth leg with a fourth hole. The first hole can be aligned with the third hole, the second hole can be aligned with the fourth hole, and a fastener can be received through the first hole, the second hole, the third hole, and the fourth hole, to secure the clevis top to the clevis bottom and define an internal area to receive the pipe. At least one of the first hole and the third hole can be surrounded by a first annular flange. At least one of the second hole and the fourth hole can be surrounded by a second annular flange.

Some embodiments of the invention provide a hanger system including a hanger body that at least partly defines an internal area to receive a pipe. The hanger body can include a saddle with an internal wall facing the internal area and an external wall facing away from the internal area. A bottom portion of the saddle can include an elongate slot open to the internal area. The elongate slot can be at least partly surrounded by at least one flange extending from the elongate slot outwardly away from the internal area.

Some embodiments of the invention provide a pipe shield for a hanger system that includes a hanger body with a saddle with an internal hanger surface, an external hanger surface, and at least one opening extending from the internal hanger surface to the external hanger surface. The pipe shield can include a shield body with an interior shield surface and an exterior shield surface. The exterior shield surface can be opposite the interior shield surface on the shield body and configured to seat on the internal hanger surface of the hanger body. An engagement feature can be configured as at least one of a hook and a tab, can extend outwardly from exterior shield surface, and can extend through the at least one opening to engage the exterior hanger surface to secure the shield body to the hanger body.

BRIEF DESCRIPTION OF THE DRAWINGS

The accompanying drawings, which are incorporated in and form a part of this specification, illustrate embodiments of the invention and, together with the description, serve to explain the principles of embodiments of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless otherwise specified or limited, the phrases "at least one of A, B, and C," "one or more of A, B, and C," and the like, are meant to indicate A, or B, or C, or any combination of A, B, and/or C, including combinations with multiple instances of A, B, and/or C. Likewise, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the invention improve on conventional clevis hanger systems in different ways. For example, conventional clevis hangers can detrimentally deform or fail when subjected to large loads. This can be particularly problematic in point-loading situations, such as when a clevis hanger is sized to support an insulated pipe, but the pipe is temporarily supported by the clevis hanger without insulation (e.g., after installation of the clevis hanger but before installation of the insulation). To help avoid deformation, some embodiments of the disclosed clevis hanger system can include a clevis hanger with a reinforcing spacer extending across an internal area of the clevis hanger. For example, legs of a clevis top can be disposed on the inside of legs of a clevis bottom, and a spacer can be secured to the legs of the clevis top so that the spacer extends fully between the legs of the clevis top. When the clevis hanger is subjected to significant loads, the spacer can help to prevent inward deformation of the legs of the clevis top and to preserve the general structural integrity of the clevis hanger.

Some embodiments of the disclosed clevis hanger system can also include a clevis hanger with reinforcing flanges at bolt holes on legs of a clevis top and a clevis bottom. For example, annular flanges can be provided at the bolt holes, extending into or away from an internal area defined by the clevis hanger. This can significantly strengthen the assembled clevis hanger. Some embodiments can further include internal threading on one or more of the reinforcing flanges, which can permit assembly of the clevis hanger without the need for a loose nut or similar other hardware.

Some embodiments of the disclosed clevis hanger system can include other features, including other flanges that help to strengthen hanger bodies of a clevis hanger against deformation or failure. For example, in some embodiments, outer edges of a clevis top or a clevis bottom can include one or more flanges that strengthen the clevis top or the clevis bottom against deformation under significant loads. In some embodiments, an opening, such as an elongate slot, can be provided in a saddle of a clevis bottom, with a flange extending from the slot to the outside of the clevis hanger. This can also strengthen the clevis bottom against deformation.

In some embodiments, a pipe shield can be configured so that the pipe shield can be secured to a hanger body, such as a clevis bottom, without requiring the use of welding, riveting, or specialized tools. For example, a shield with a rounded body can be configured with engagement features, such as one or more hooks or tabs, that extend away from the rounded body. When the shield body is rested on a clevis bottom, these engagement features can extend through an opening in the clevis bottom, such as the above-noted elongate slot. In this configuration, to secure the shield to the clevis bottom, the engagement features configured as hooks can be seated against the clevis bottom (e.g., against a flange around the opening), and the engagement features configured as tabs can be deformed (e.g., bent by hammering) to engage the clevis bottom.

In some examples below, hanger systems using clevis hangers are discussed. It will be understood that some embodiments of the invention can include, or can be used with, other types of hangers for pipes. Further, in some examples below, hanger bodies of hanger systems are presented as generally symmetrical about a centerline. It will be understood that some embodiments of the invention can include hanger bodies that are not symmetrical.

Figure 1:
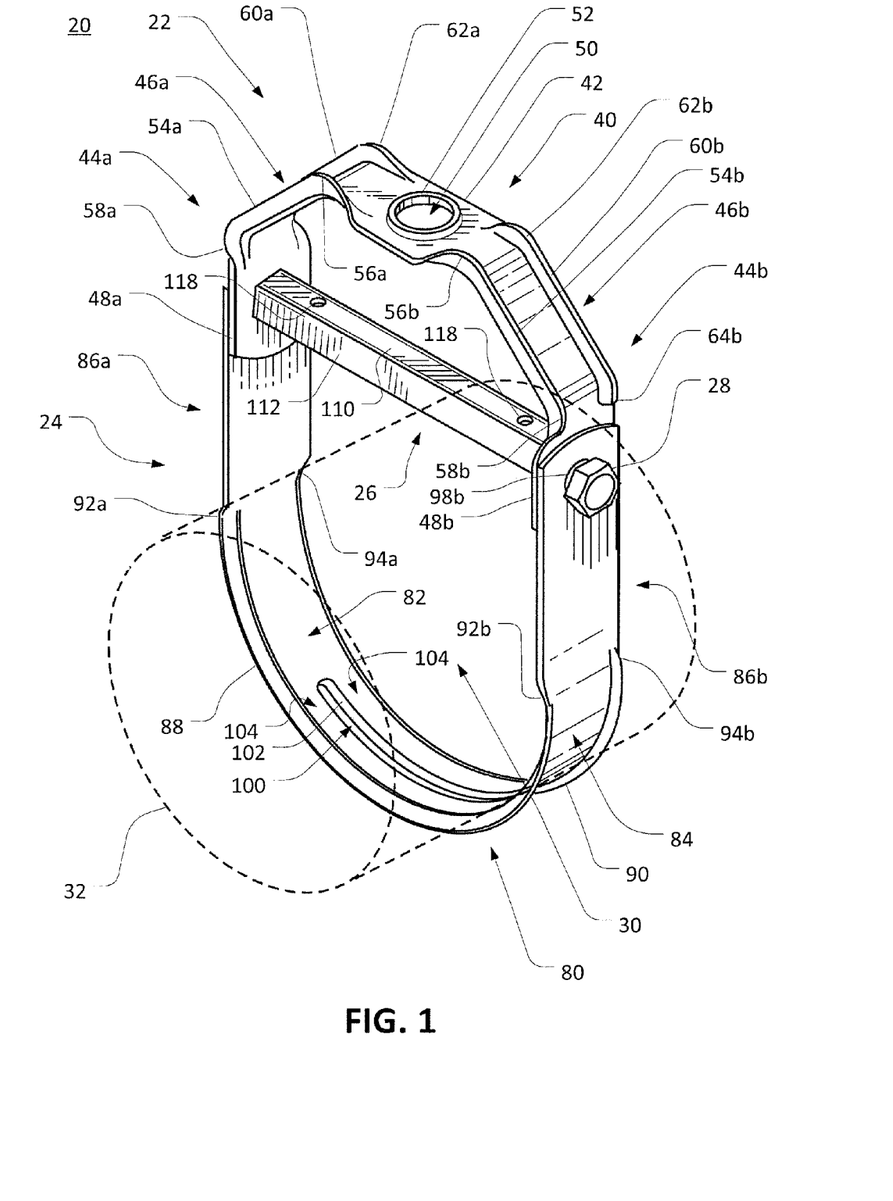
FIG. 1 is a left, front, top perspective view of a clevis hanger for use in a clevis hanger system, according to some embodiments of the invention.
Figure 2:
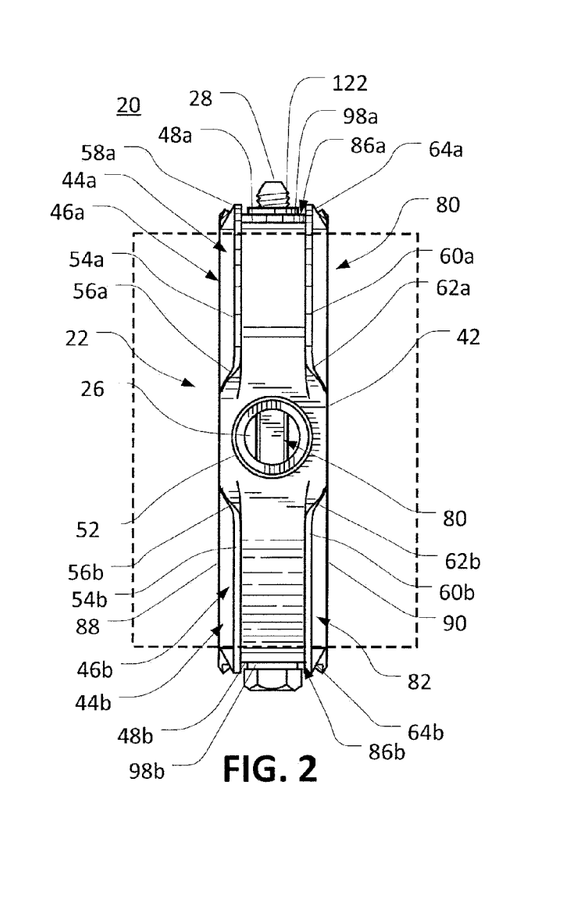
FIG. 2 is a top plan view of the clevis hanger of FIG. 1.
Figure 3:
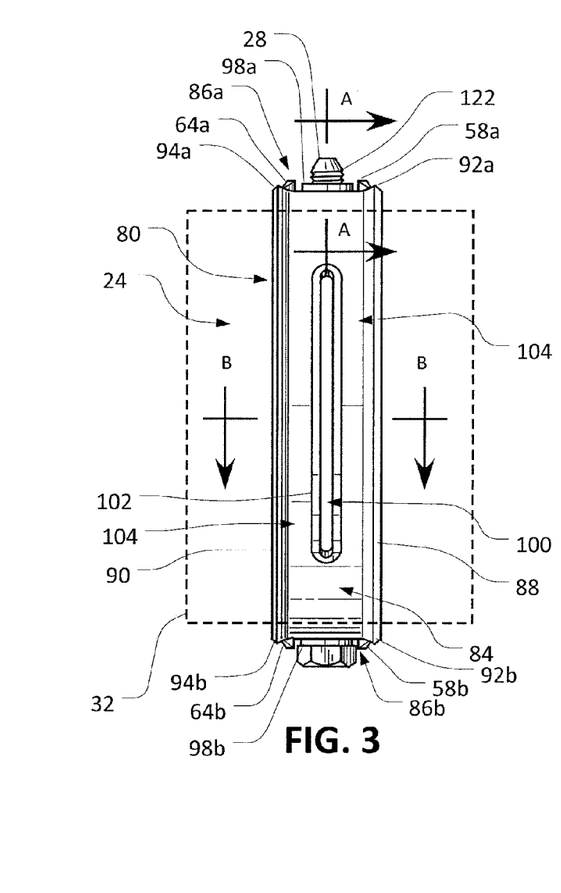
FIG. 3 is a bottom view of the clevis hanger of FIG. 1.

FIGS. 1 through 3 illustrate a clevis hanger 20 for use in a clevis hanger system, according to some embodiments of the invention. It will be understood that the clevis hanger 20, including the features discussed below, is presented as an example only, and that other configurations are possible. Generally, the clevis hanger 20 includes top and bottom hanger bodies, configured, in the embodiment illustrated, as a clevis top 22 and a clevis bottom 24. The clevis hanger also includes a spacer 26 and a bolt 28. When fully assembled, as illustrated in FIGS. 1 through 3, the clevis hanger 20 can define an internal area 30, within which the clevis hanger 20 can support a pipe 32. The pipe 32 can be a bare pipe or an insulated pipe and can be formed from various materials, including metal (e.g., steel) or composite (e.g., chlorinated polyvinyl chloride ("CPVC")).

Figures 4, 5, 6A, 6B:
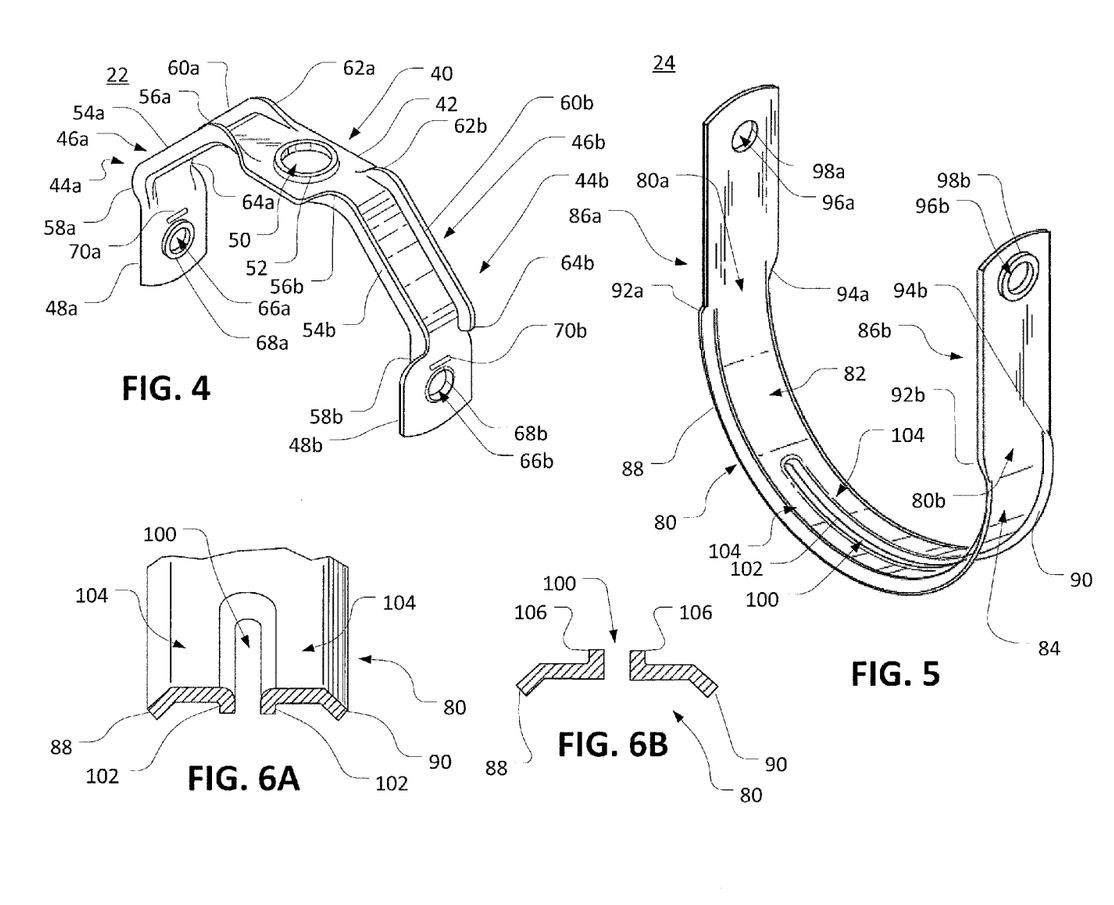
FIG. 4 is a left, front, top perspective view of a clevis top of the clevis hanger of FIG. 1.
FIG. 5 is a left, front, top perspective view of a clevis bottom of the clevis hanger of FIG. 1.
FIG. 6A is a partial sectional view of the clevis hanger of FIG. 1, taken along plane A-A of FIG. 3, showing one configuration of a flange of the clevis hanger of FIG. 1.
FIG. 6B is a partial sectional view of the clevis hanger of FIG. 1, taken along plane A-A of FIG. 3, showing another configuration of a flange of the clevis hanger of FIG. 1.

As also illustrated in FIG. 4, the clevis top 22 includes a hanging portion 40 with a generally flat central region 42. The clevis top 22 also includes legs 44a and 44b with struts 46a and 46b extending away from the central region 42 and with vertical portions 48a and 48b extending generally downwardly from the struts 46a and 46b, respectively. The clevis top 22 can be formed from steel, or from various other materials (e.g., other metals, alloys, or composites). In some embodiments, the clevis top 22 can be formed from a unitary strip of material (e.g., strip steel) that is stamped, bent, extruded and otherwise shaped into the illustrated configuration.

The central region 42 of the clevis top 22 includes a hole 50 that can be used to hang the clevis top 22 and the clevis hanger 20 generally from a hanging support such as a threaded rod (not shown). The hole 50 is configured as a generally round hole, and is surrounded by an annular flange 52 that extends upward from the central region 42 of the clevis top 22, away from the internal area 30 (see, e.g., FIG. 1), to exhibit a generally uniform height, relative to the clevis top 22. In some embodiments, a rounded shoulder can be included between the annular flange 52 and the flat portion of the central region 42 of the clevis top 22. In some embodiments, the annular flange 52 can be formed using an extrusion process. For example, the hole 50 can be formed initially with a smaller diameter than illustrated in FIG. 4, and then a succession of tapered rods or similar devices moved into or through the hole 50 both to enlarge the hole 50 to the illustrated diameter and to form the annular flange 52.

In some embodiments, an annular flange surrounding the hole 50 can extend downward from the central region 42 of the clevis top 22 into the internal area 30. In some embodiments, an annular flange that extends into the internal area 30 can be included in addition to the upwardly extending annular flange 52.

As noted above, the struts 46a and 46b of the legs 44a and 44b, respectively, extend away from the central region 42 of the clevis top 22. In some embodiments, including as illustrated, the struts 46a and 46b can extend away from the central region 42 at an angle, such as a 45 degree angle or another suitable angle. In some embodiments, other configurations are possible, including configuration of the struts 46a and 46b (or the legs 44a and 44b, generally) with curved or other geometry.

In order to strengthen the legs 44a and 44b and the clevis top 22 generally against deformation, the legs 44a and 44b can include one or more flanges extending along the outer edges of the legs 44a and 44b. As illustrated, for example, a flange 54a extends away from the internal area 30 along one side of the strut 46a. The flange 54a is generally bent perpendicularly to the strut 46a and flattens at continuous curved end regions 56a and 58a onto the central region 42 of the hanging portion 40 and the leg 44a, respectively. Similarly, a flange 60a extends away from the internal area 30 along an opposite side of the strut 46a, is generally bent perpendicularly to the strut 46a, and flattens at continuous curved end regions 62a and 64a onto the central region 42 of the hanging portion 40 and the leg 44a, respectively. Similarly configured flanges 54b and 60b are provided on the strut 46b, with continuous curved end regions 56b, 58b, 62b and 64b.

In other embodiments, differently configured flanges can be included on a clevis top. As also discussed below, for example, a continuous flange can extend across a central hanging portion and along opposite legs of a clevis top.

To help secure the clevis top 22 to the clevis bottom 24, the vertical portions 48a and 48b of the legs 44a and 44b can include holes 66a and 66b, respectively, as shown in FIG. 4. Generally, the holes 66a and 66b are configured as round holes, and are surrounded by respective annular flanges 68a and 68b that extend inwardly from the vertical portions 48 and 48b of the legs 44a and 44b, into the internal area 30 (see, e.g., FIG. 1). In some embodiments, a rounded shoulder can be included between the annular flanges 68a and 68b and the surrounding material of the legs 44a and 44b. In some embodiments, the annular flanges 68a and 68b can be formed using an extrusion process. For example, the holes 66a and 66b can be formed initially with smaller diameters than illustrated in FIG. 4, and then a succession of tapered rods or similar devices moved into or through the holes 66a or 66b both to enlarge the holes 66a and 66b to the illustrated diameter and to form the annular flange 52.

To help secure a spacer to the clevis hanger 20, as also discussed below, the legs 44a and 44b of the clevis top 22 can also include opening such as slots 70a and 70b, as also shown in FIG. 4. In the embodiment illustrated, the slots 70a and 70b are formed as generally horizontal, elongated openings on the vertical portions 48a and 48b of the legs 44a and 44b, somewhat above the holes 66a and 66b and the associated annular flanges 68a and 68b. As illustrated, the slots 70a and 70b extend fully through the legs 44a and 44b from the internal area 30 to the exterior of the clevis top 22. In other embodiments, other configurations are possible, including slots that extend only partly through the legs 44a and 44b.

As illustrated in FIG. 5, in particular, the clevis bottom 24 includes a saddle, such as a curved saddle 80, for receiving the pipe 32, as well as legs 86a and 86b that extend generally upwardly from opposite ends 80a and 80b, respectively, of the saddle 80. The saddle 80 includes an internal wall 82 that faces the internal area 30 (see, e.g., FIG. 1), and an external wall 84 that faces away from the internal area 30. As illustrated, both the internal wall 82 and the external wall 84 exhibit a generally circular profile extending over a circumferential extent of approximately 180 degrees, although other configurations are possible, including shortened circular profiles, angled profiles, or combinations thereof.

The clevis bottom 24 can be formed from steel, or from various other materials (e.g., other metals, alloys, or composites). In some embodiments, the clevis bottom 24 can be formed from a unitary strip of material (e.g., strip steel) that is stamped, bent, extruded and otherwise shaped into the illustrated configuration.

In order to strengthen the saddle 80 and the clevis bottom 24 generally against deformation, the saddle 80 can include one or more flanges extending along the outer edges of the saddle 80. As illustrated, for example, a flange 88 extends away from the internal area 30 along one side of the saddle 80, and a flange 90 extends away from the internal area 30 along an opposite side of the saddle 80. The flanges 88 and 90 are generally bent at an angle to the saddle 80 (e.g., at a 45 degree angle) and flatten onto the legs 86a and 86b of the clevis bottom 24 at continuous curved end regions 92a, 92b, 94a, and 94b.

The angled configuration of the flanges 88 and 90 can be useful to facilitate installation of the pipe 32 on the clevis hanger 20. For example, in some installations, the clevis hanger 20 can be assembled and hung from a hanging support, then the pipe 32 threaded (or "stabbed") through the internal area 30 so that the pipe 32 is supported by the saddle 80 of the clevis bottom 24. In an installation of this type, the angled configuration of the flanges 88 and 90 can help to guide the pipe 32 into the internal area 30 (see, e.g., FIG. 1). Further, due to the angled configuration of the flange 88 and 90, the edges of the saddle 80 along the flanges 88 and 90 are generally angled away from the exterior of the pipe 32 as the pipe 32 is threaded into (and supported by) the saddle 80. Accordingly, as the pipe 32 is slid into and along the saddle 80, the pipe 32 can be protected from inadvertent scratches or other damage that might otherwise result from any burrs or other defects along the edges of the saddle 80.

In other embodiments, differently configured flanges can be included on a clevis bottom or other hanger body. For example, a series of discontinuous flanges can extend along a particular side (or along both sides) of a clevis top, with a break between the discontinuous flanges that is similar to the break between the flanges 54a and 60a (see, e.g., FIG. 4). Similarly, in other embodiments, curved configurations or other angles for the flanges 88 and 90 are possible, including 90 degree angles, with curved or chamfered transitions to the remainder of the saddle 80.

To help secure the clevis bottom 24 to the clevis top 22, the legs 86a and 86b of the clevis bottom 24 can include holes 96a and 96b, respectively, as shown in FIG. 5. Generally, the holes 96a and 96b are configured as round holes, and are surrounded by respective annular flanges 98a and 98b that extend outwardly from the legs 86aa and 86b, away from the internal area 30 (see, e.g., FIG. 1). In some embodiments, a rounded shoulder can be included between the annular flanges 98a and 98b and the surrounding material of the legs 86a and 86b. In some embodiments, the annular flanges 98a and 98b can be formed using an extrusion process. For example, the holes 96a and 96b can be formed initially with smaller diameters than illustrated in FIG. 5, and then a succession of tapered rods or similar devices moved into or through the holes 96a or 96b both to enlarge the holes 96a and 96b to the illustrated diameter and to form the annular flange 52.

In some embodiments, internal threading (not shown in FIG. 5) can be formed in one or more of the holes 96a and 96b. As also discussed below, this can be useful to allow assembly of the clevis hanger 20 with a single bolt (or other threaded fastener) without requiring a separate nut.

In some embodiments, a saddle of a clevis bottom or other hanger body can include one or more openings, which can be used to provide structural strength to the clevis bottom or other hanger body, or to help secure a pipe shield to the clevis bottom, as also discussed below. As illustrated in FIG. 5, for example, the saddle 80 of the clevis bottom 24 includes an opening configured as an elongate slot 100 that is open to the internal area 30 and extends between the internal wall 82 and the external wall 84 of the saddle 80. As illustrated, the slot 100 is located on a bottom portion of the saddle 80, symmetrically between the legs 86a and 86b, and extends only partially between the legs 86a and 86b (e.g., along a circumferential extent of about 60 degrees). In other embodiments, other configurations are possible, including configurations in which the slot 100 extends over a circumferential extent of between 0 and 180 degrees, between 0 and 120 degrees, between 30 and 120 degrees, or between 30 and 90 degrees.

In some embodiments, an opening in a clevis bottom can be at least partly surrounded by at least one flange. For example, in the embodiment illustrated, the slot 100 is fully surrounded by a continuous flange 102 that extends outwardly from the slot 100 away from the internal area 30. As illustrated in FIG. 6A, in particular, the flange 102 extends generally perpendicularly to a locally flat support region 104 of the saddle 80 that is disposed between the flange 102 and the flanges 88 and 90. In other embodiments, the flange 102 can extend at other angles to the support region 104. Also as illustrated in FIG. 6A, the flange 102 extends less far from the support region 104 than do the flanges 88 and 90. In other embodiments, other configurations are possible.

In the embodiment illustrated in FIG. 6A, the flange 102 extends outwardly from the slot 100 away from the internal area 30. In some embodiments, a flange can extend inwardly from the slot 100 into the internal area 30. As illustrated in FIG. 6B, for example, a flange 106 can extend inwardly from the slot 100 into the internal area 30.

In some embodiments, the flange 102 or the flange 106 can help to strengthen the clevis bottom 24 against deformation or failure. For example, the cross-sectional profiles illustrated in FIGS. 6A and 6B can provide increased bending resistance to the saddle 80, so that the saddle 80 can support a correspondingly increased weight of a pipe (e.g., the pipe 32) without unwanted deformation. This can be particularly useful, for example, when the saddle 80 is point loaded, such as when the clevis hanger 20 is sized to support a relatively large diameter insulated pipe but the smaller diameter un-insulated pipe is installed on the clevis hanger 20 before installation of the insulation.

In some embodiments, the flange 102 (or the flange 106) can be formed using an extrusion process. For example, the slot 100 can be formed initially with a smaller length and width than illustrated in FIGS. 5 and 6A, and then a succession of tapered bodies or similar devices moved into or through the slot 100 both to enlarge the slot 100 to the illustrated size and to form the flange 102.

In some embodiments, as also discussed below, openings such as the slot 100 (along with the flange 102) can help to secure a pipe shield to the clevis bottom 24. For example, engagement features on a pipe shield can be configured to extend through the slot 100 and engage the flange 102 in order to secure the pipe shield to the clevis bottom 24.

Figure 7:
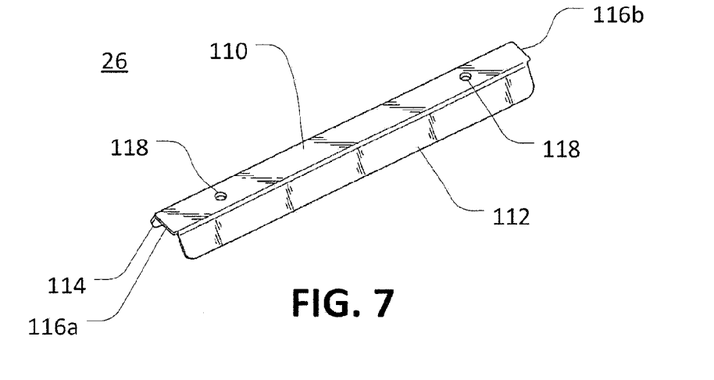
FIG. 7 is a left, front, top perspective view of a spacer of the clevis hanger of FIG. 1.

A spacer to strengthen a clevis hanger or other hanger body can be configured in various ways. In some embodiments, a spacer can be formed with circular or otherwise curved cross-section. In some embodiments, a spacer can be formed with a generally angular cross-section. As illustrated in FIG. 7, for example, the spacer 26 includes a generally flat top portion 110, with side flaps 112 and 114 angling generally downward from the top portion 110. At opposite axial ends of the spacer 26, the top portion 110 can extend into tabs 116a and 116b, which can be sized to fit into the slots 70 on the clevis top 22 (see, e.g., FIG. 4). As illustrated, the tabs 116a and 116b are configured as flat tabs and can be held in the slots 70 without deformation of the tabs 116a and 116b. In other embodiments, other configurations are possible.

In some embodiments, the spacer 26 can be formed from a unitary piece of metal or other material, including through roll forming, stamping, or other processes. In some embodiments, the spacer 26 can include additional features, such as top holes 118, for manufacturing or other purposes.

Figure 8:
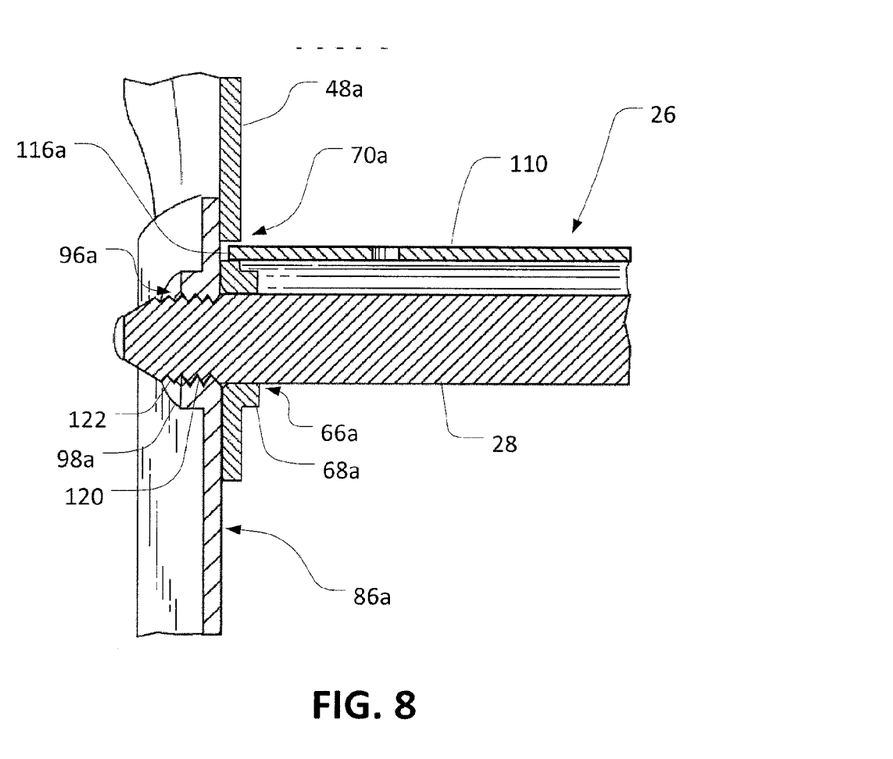
FIG. 8 is a partial sectional view of the clevis hanger of FIG. 1, taken along plane B-B of FIG. 3.

To assemble the clevis hanger 20, as illustrated in FIGS. 1 and 8, in particular, the vertical portions 48a and 48b of the legs 44a and 44b of the clevis top 22 can be disposed to the inside of the legs 86a and 86b of the clevis bottom 24, relative to the internal area 30. The holes 66a and 66b can be aligned with the holes 96a and 96b and the bolt 28 inserted through the holes 66a, 66b, 96a and 96b to secure the clevis top 22 to the clevis bottom 24. As noted above, one or more of the holes 66a, 66b, 96a and 96b can be threaded for this purpose, so that the bolt 28 (or another threaded fastener) can be secured in place without requiring a separate nut. As illustrated in FIG. 8, for example, the hole 96a can be provided with internal threads 120 configured to engage external threads 122 on an end of the bolt 28.

In some embodiments, tightening the bolt 28 into the threads 120 can also help to secure the spacer 26 in place. For example, tightening the bolt 28 can compress the legs 44a, 44b, 86a, and 86b somewhat inward, which can firmly seat the tabs 116a and 116b of the spacer 26 within the slots 70a and 70b.

In some embodiments, tightening the bolt 28 into the threads 120 can also help to restrict rotation of the clevis bottom 24 relative to the clevis top 22. This can be useful, for example, in order to facilitate relatively easy threading of the pipe 32 into the clevis hanger 20 after the clevis hanger 20 has been fully assembled.

As also noted above, the annular flanges 68a and 68b on the clevis top 22 and the annular flanges 98a and 98b on the clevis bottom 24 can generally help to strengthen the clevis hanger 20 against deformation or failure. As illustrated in FIG. 8, for example, the annular flanges 68a and 98a can generally increase the load-bearing surface area of the holes 66a and 96a as compared to holes without similar flanges. As the clevis hanger 20 is loaded, and the bolt 28 accordingly resists shear between the clevis top 22 and the clevis bottom 24, this increased area can provide significantly increased strength to the clevis top 22 and the clevis bottom 24, without the need to increase the thickness of the entire clevis top 22 and the entire clevis bottom 24.

Figure 9A:
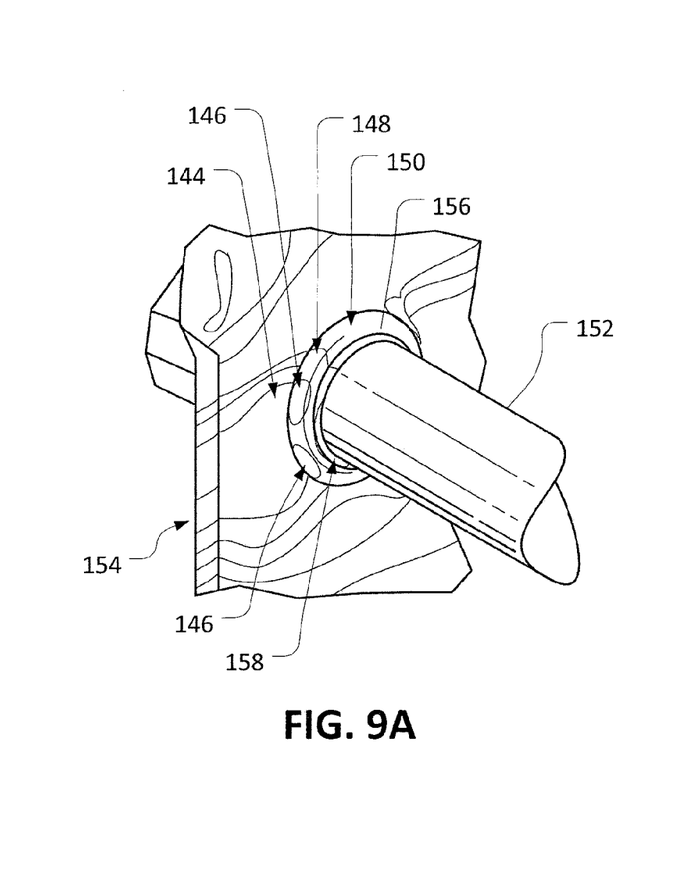
FIG. 9A is a partial left, rear, top perspective view showing stress distributions in a hanger body under a load, according to some embodiments of the invention.
Figure 9B:
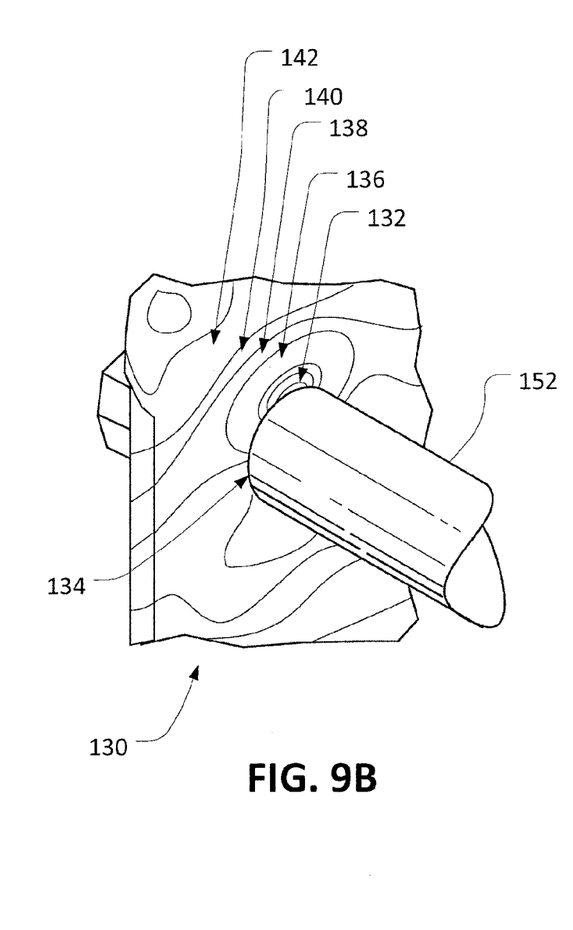
FIG. 9B is a partial left, rear, top perspective view showing stress distributions in a conventional hanger body under the same load applied in FIG. 9A.

Finite Element Analysis ("FEA") has shown that annular flanges, such as the annular flanges 68a, 68b, 98a, and 98b, can allow the clevis top 22 and the clevis bottom 24 to perform as well as other clevis tops and clevis bottoms with significantly greater overall material thickness, and to outperform other clevis tops and clevis bottoms with similar overall material thickness but no extruded or other flanges similar to the annular flanges 66a, 66b, 96a, and 96b. As illustrated in FIGS. 9A and 9B, for example, when a hanger body 130 without a flange similar to the annular flange 68b is vertically loaded via a bolt 152 inserted through a bolt hole 134, the hanger body 130 can exhibit an area 132 of relatively high von Mises yield stress around the bolt hole 134. As shown in FIG. 9B, from the area 132, the von Mises yield stresses transition progressively to relatively low von Mises yield stress at areas 136, 138, 140, and 142 that are relatively far from the hole 134. In contrast, a hanger body 154 may exhibit a similar general material thickness as the hanger body 130, but may also include an annular flange 156 around a bolt hole 158, similar to the annular flanges 66a, 66b, 96a, and 96b. As shown in FIG. 9A, when the hanger body 154 is placed under the same load as illustrated for the hanger body 154 in FIG. 9B, there may be no area around the bolt hole 158 and the annular flange 156 that exhibits von Mises yield stresses levels comparable to the area 132 on the clevis bottom 130. Indeed, due to the inclusion of the annular flange 156, the maximum von Mises yield stresses near the bolt hole 158 of the hanger body 154, in an area 144, may be generally on the order of the reduced von Mises yield stresses seen in the area 136 on the clevis bottom 130. Further, the significantly reduced stresses of the areas 138 and 140 on the hanger body 130 can obtain, respectively, in areas 146, 148 and 150 on the hanger body 154 that are immediately adjacent to the bolt hole 158. As a result, under comparable loading, the bolt hole 158 and the hanger body 154 can be far less susceptible to deformation or failure than the bolt hole 134 and the hanger body 130.

In some embodiments, other components or structures can be used to strengthen clevis hangers or other hanger bodies at various holes. For example, the bearing surface of a hole in a hanger body (e.g., the holes 66a and 66b in the clevis top 22, or the holes 96a and 96b in the clevis bottom 24) can be increased by adding a separate component, such as a bushing.

In the embodiment illustrated in FIGS. 1 through 8, the vertical portions 48a and 48b of the legs 44a and 44b of the clevis top 22 are disposed on the inside of the legs 86a and 86b of the clevis bottom 24. In order to avoid interference between the annular flanges 68a, 68b, 98a and 98b, the annular flanges 68a and 68b on the clevis top 22 extend inwardly from the legs 44a and 4b into the internal area 30, and the annular flanges 98a and 98b extend outwardly from the legs 86a and 86b, outside of the internal area 30. In other embodiments, other configurations are possible. For example, in some embodiments, one or more legs on a clevis top can be disposed on the outside of one or more legs on a clevis bottom, with annular flanges on the one or more legs on the clevis top extending outwardly, and annular flanges on the one or more legs on the clevis bottom extending inwardly.

Also in the embodiment illustrated in FIGS. 1 through 8, the slots 70a and 70b for holding the spacer 26 are included on the clevis top 22, so that the spacer 26 can span the internal area 30 when the legs 44a and 44b of the clevis top 22 are disposed on the inside of the legs 86a and 86b of the clevis bottom 24. This may be useful, for example, in order to allow the spacer 26 to be installed before the clevis hanger 20 is fully assembled, while still allowing a pipe to be moved freely between the legs 86a and 86b of the clevis bottom 24. In other embodiments, however, other configurations are possible. For example, where legs on a clevis top are disposed on the outside of legs on a clevis bottom, it may be useful to include slots for a spacer on the clevis bottom, rather than on the clevis top.

In some embodiments, the disclosed hanger system can include a pipe shield. A pipe shield can be useful, for example, in order to support insulated pipe on a clevis hanger such as the clevis hanger 20. Accordingly, a pipe shield can generally include a relatively large support area as compared to a clevis hanger, so that contact forces between the clevis hanger and the insulation does not unduly compress or otherwise damage the insulation.

In some embodiments, a pipe shield can include structures that allow the pipe shield to be attached to part of a clevis hanger, or to another hanger body, without requiring welding, riveting, or specialized tools. For example, as also discussed below, a pipe shield can include engagement features that are configured to extend through openings in a clevis bottom, in order to secure the pipe shield to the pipe shield to the clevis bottom.

Figure 10:
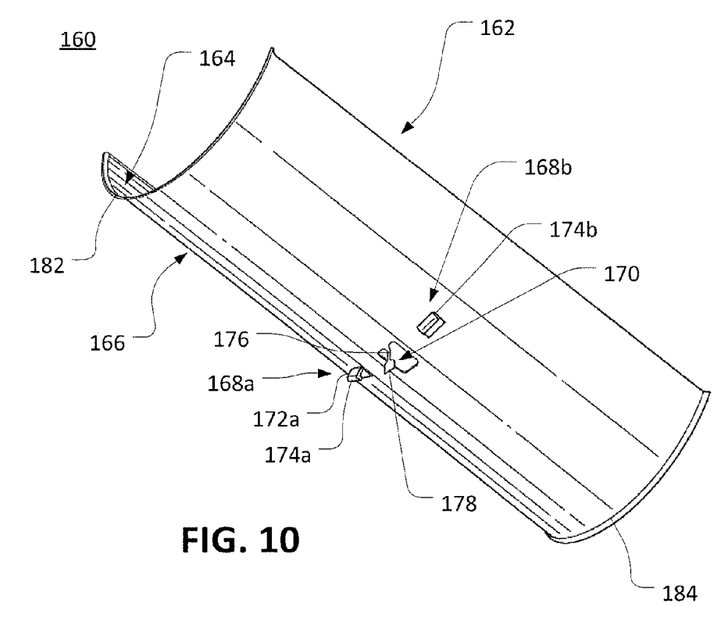
FIG. 10 is a right, rear, bottom perspective view of a pipe shield for use with the clevis hanger of FIG. 1.
Figure 11:
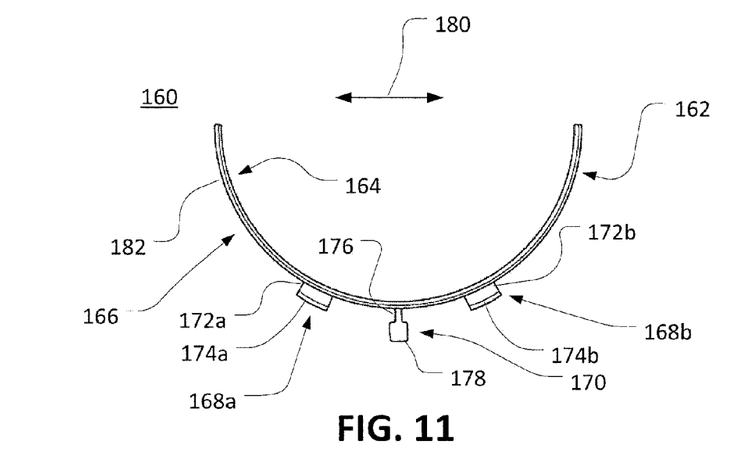
FIG. 11 is a front elevation view of the pipe shield of FIG. 10.

As illustrated in FIGS. 10 and 11, a pipe shield 160 includes a shield body 162 configured as a cylindrical tubular section (e.g., a semi-cylindrical tube) with an interior surface 164 and an exterior surface 166. Generally, the interior surface 164 can be configured to support a pipe (e.g., an insulated pipe) and the exterior surface can be configured to at least partly seat on an internal surface of a hanger body, such as the internal wall 82 of the saddle 80 of the clevis bottom 24.

A number of engagement features can extend from the shield body 162, in order to assist in securing the pipe shield 160 to the relevant hanger body (e.g., the clevis bottom 24). In the embodiment illustrated, for example, the pipe shield 160 includes hooks 168a and 168b and a bendable tab 170 extending outwardly from the exterior surface 166 of the shield body 162. Generally, the hooks 168a and 168b include strut portions 172a and 172b connected to and extending outwardly from the exterior surface 166, and hooked portions 174a and 174b supported by the strut portions 172a and 172b at the free ends of the hooks 168a and 168b. In the embodiment illustrated, the hooked portions 174a and 174b each curve in the same direction. In other embodiments, other configurations are possible.

The bendable tab 170 generally includes a neck portion 176 connected to and extending outwardly from the exterior surface 166, and an end portion 178 at a free end of the bendable tab 170. In the embodiment illustrated, the neck portion 176 is generally narrower than the end portion 178 in a direction 180 transverse an axial length of the pipe shield 160 (see FIG. 11). This can be useful, for example, in order to allow the bendable tab 170 to be deformed relatively from the straight configuration illustrated in FIGS. 10 and 11, while still providing, via the end portion 178, a relatively large area for engagement with other features.

The bendable tab 170 and the hooks 168a and 168b can be formed in various ways. In some embodiments, the bendable tab 170 and the hooks 168a and 168b can be integrally formed with the shield body 162, including via stamping or other processes. In some embodiments, the bendable tab 170 and the hooks 168a and 168b can be surrounded by openings on the shield body 162 that are larger in area than the bendable tab 170 and the hooks 168a and 168b.

In some embodiments, one or more engagement features can extend from a hanger body to assist in securing a pipe shield to the hanger body. For example, a bendable tab similar to the bendable tab 170 or a hook similar to the hooks 168a and 168b can extend (not shown) from the saddle 80 through an opening in the shield body 162, such as one of the openings adjacent to the bendable tab 170 and the hooks 168a and 168b (see, e.g., FIG. 10). In some embodiments, to secure a pipe shield to a hanger body, one or more engagement features on the pipe shield (e.g., features similar to the bendable tab 170 or the hooks 168a and 168b) can engage the hanger body, and one or more engagement features on the hanger body (e.g., features similar to the bendable tab 170 or the hooks 168a and 168b) can engage the pipe shield.

In some embodiments, the pipe shield 160 can include other features. For example, in the embodiment illustrated, opposite axial ends of the shield body 162 include curved flanges 182 and 184. The flanges 182 and 184 can help to strengthen the shield body 162 and can help to guide pipes onto the pipe shield 160, similarly to the flanges 88 and 90 of the saddle 80 (see, e.g., FIG. 5).

Figure 12:
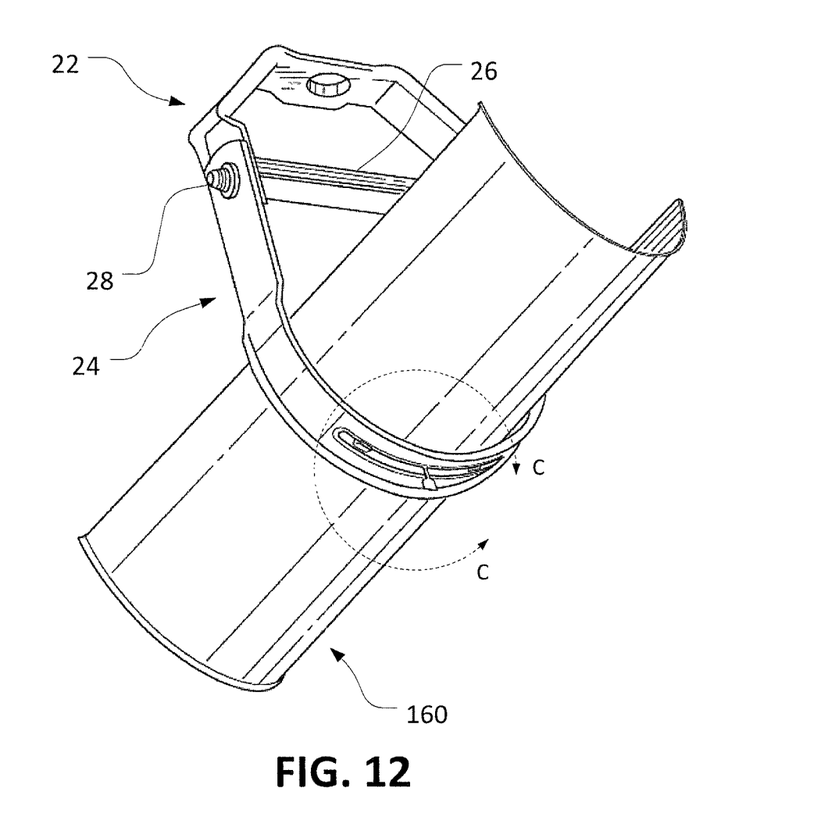
FIG. 12 is a right, front, bottom perspective view of the pipe shield of FIG. 10 installed in a clevis hanger system with the clevis hanger of FIG. 1.
Figure 13A:
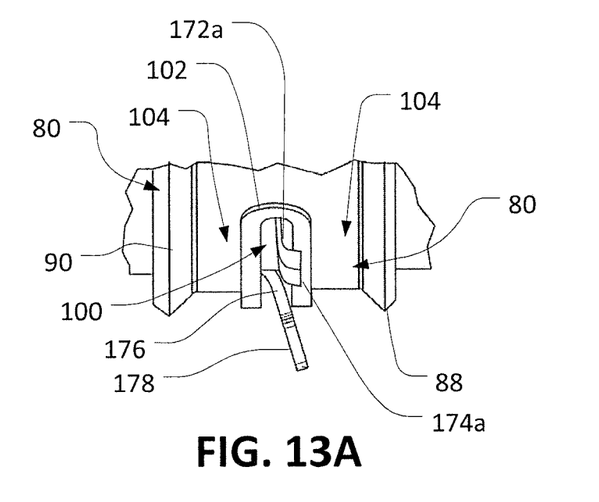
FIGS. 13A and 13B are a partial right elevation views of area C-C of FIG. 12, showing a process for installing the pipe shield of FIG. 10 with the clevis hanger of FIG. 1.
Figure 13B:
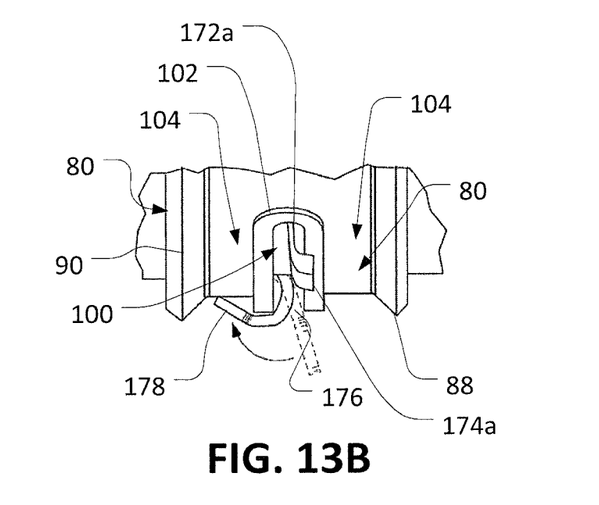

As illustrated in FIGS. 12 through 13B, in order to secure the pipe shield 160 to the clevis hanger 20, the pipe shield 160 can be inserted into the internal area 30 and aligned so that the hooks 168a and 168b and the bendable tab 170 can be inserted through the slot 100. In some embodiments, the hooks 168a and 168b can be configured to pass through the slot 100 with full clearance, so that the hooks 168a and 168b do not need to be deformed. In some embodiments, the hooks 168a and 168b can be configured to deform somewhat as the hooks 168a and 168b are inserted into the slot 100. For example, the hooks 168a and 168b can be configured to snap into place within the slot 100 so that a relatively large amount of force may be required to remove the hooks 168a and 168b from the slot 100.

Once the hooks 168a and 168b have been inserted into the slot 100, the hooked portions 174a and 174b of the hooks 168a and 168b can engage the external wall 84 of the saddle 80 in order to resist withdrawal of the hooks 168a and 168b and the bendable tab 170 from the slot 100. In the embodiment illustrated, the hooked portions 174a and 174b engage the external wall 84 at the flange 102. In other embodiments, the hooked portions 174a and 174b can instead (or additionally) engage the external wall 84 at other locations.

To further secure the pipe shield 160 to the clevis hanger 20, the bendable tab 170 can be bent to also contact the external wall 84 (or other features). In some embodiments, as illustrated in FIG. 13B, the bendable tab 170 can be bent in an opposite direction as the bend of the hooked portions 174a and 174b of the hooks 168a and 168b. This can be useful, for example, to ensure that the hooks 168a and 168b and the bendable tab 170 cooperate to generally restrict axial movement of the pipe shield 160, as well as to generally prevent removal of the pipe shield 160 from the clevis bottom 24.

The bendable tab 170 can be bent in different ways. In some embodiments, the bendable tab 170 can be configured to be bent to a locking configuration (see FIG. 13B) via hammering or similar impacts. In some embodiments, the bendable tab 170 can be configured to be bent to the locking configuration manually, by way of a lever tool (e.g., a screwdriver levered into the slot 100), or in various other ways. In this regard, for example, the narrower width of the neck portion 176 of the bendable tab 170 can allow the bendable tab 170 to be bent to the locking configuration without requiring excessive force.

The bendable tab 170 can also be bent to different degrees relative to the clevis bottom 24. In some embodiments, the bendable tab 170 can be bent sufficiently to allow the end portion 178 to contact the external wall 84 of the saddle 80, at a location that is spaced apart from the flange 102 on the slot 100. In some embodiments, other degrees of bending may be possible. In some embodiments, the bendable tab 170 can be bent sufficiently that some or all of the end portion 178 is flattened against the external wall 84.

In some embodiments, once the hooks 168a and 168b have been inserted into the slot 100, but before the bendable tab 170 is bent to the locking configuration, the shield body 162 can be manipulated to move the hooks 168a and 168b into tight contact against the interior wall of the flange 102. In some embodiments, the bending of the bendable tab 170 (e.g., manually, or via hammer blows) can serve both to move the bendable tab 170 into the locking configuration and to seat the hooks 168a and 168b against the flange 102.

In some embodiments, a pipe shield with engagement members such as the hooks 168a and 168b and the bendable tab 170 can be used with an opening that does not include a flange or other similar feature. For example, in some embodiments, the slot 100 may not be surrounded by the flange 102. In those embodiments, the hooks 168a and 168b and the bendable tab 170 can still be inserted through the slot 100, and the bendable tab 170 still bent to the locking configuration. However, the hooks 168a and 168b and the bendable tab 170 may engage features on the external wall 84 of the saddle 80 other than the flange 102.

In some embodiments, engagement members other than (or in addition to) the hooks 168a and 168b and the bendable tab 170 can be used. For example, some pipe shields can be provided with fewer (or no) hooks, or with multiple (or no) bendable tabs.

Figure 14:
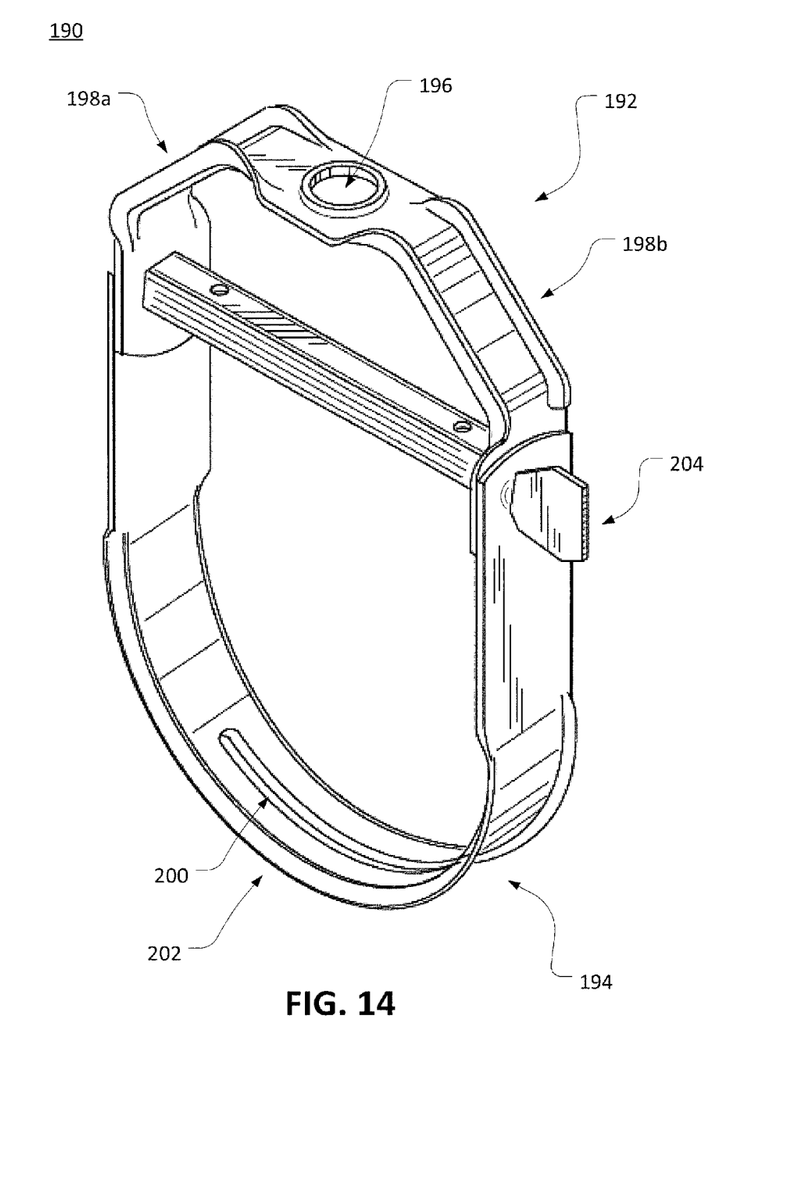
FIG. 14 is a left, front, top perspective view of another clevis hanger for use in a clevis hanger system, according to some embodiments of the invention.

FIG. 14 illustrates a clevis hanger 190 for use in a clevis hanger system, according to some embodiments of the invention. The clevis hanger 190 can be configured generally similarly to the clevis hanger 20, with a clevis top 192 and a clevis bottom 194 that each include various flanges, including flanges around a top hole 196 in the clevis top 192, flanges on either sides of struts 198*a* and 198*b* of the clevis top 192, flanges surrounding bolt holes (hidden from view in FIG. 14) in both the clevis top 192 and the clevis bottom 194, flanges surrounding a slot 200 in a saddle 202 of the clevis bottom 194, and so on. In contrast to the clevis hanger 20, however, the clevis hanger 190 uses a thumb screw 204 in place of a conventional bolt. An operator can turn the thumb screw 204 by hand to engage internal threading on a flange surrounding a bolt hole in the clevis bottom 194, thereby potentially assembling the clevis hanger 190 without the use of any tools.

Figure 15:
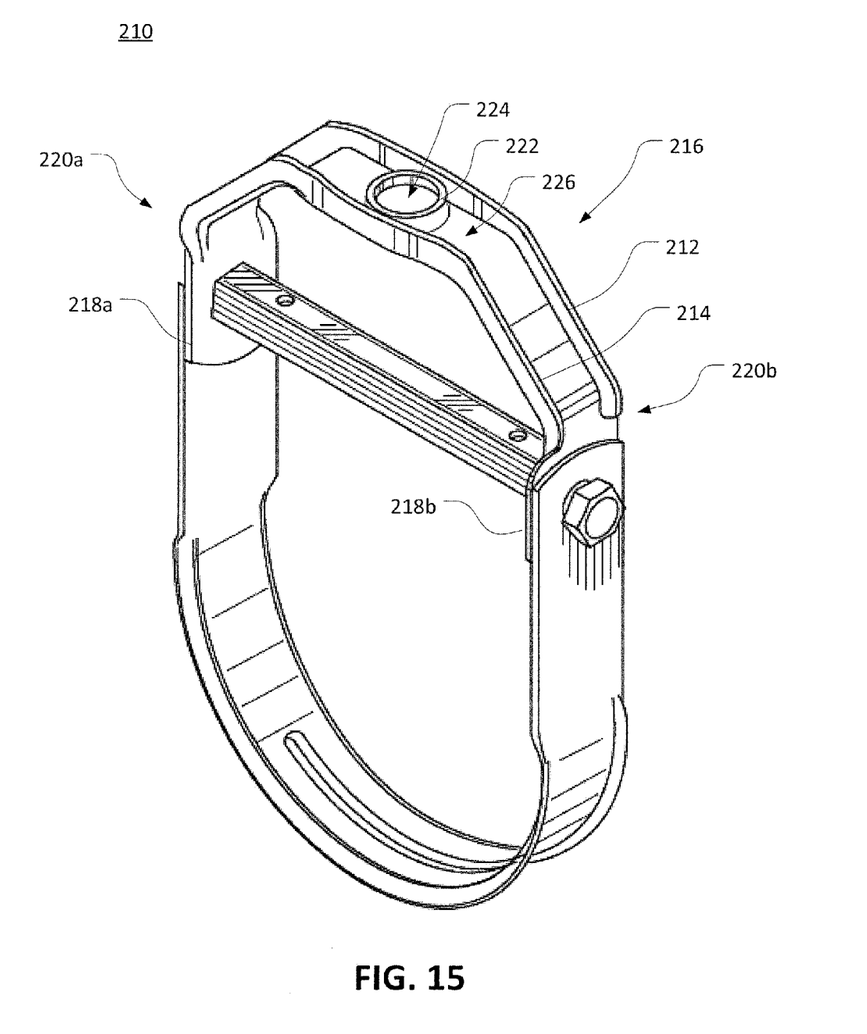
FIG. 15 is a left, front, top perspective view of yet another clevis hanger for use in a clevis hanger system, according to some embodiments of the invention.

FIG. 15 illustrates a clevis hanger 210 for use in a clevis hanger system, according to some embodiments of the invention. Similarly to the clevis hanger 190, the clevis hanger 210 can be configured generally similarly to the clevis hanger 20. In contrast to the clevis hanger 20, however, flanges 212 and 214 on a clevis top 216 of the clevis hanger 210 extend continuously along either side of the clevis top 216 between the top ends of vertical portions 218*a* and 218*b* of legs 220*a* and 220*b* of the clevis top 216. This configuration may be useful, for example, for supporting smaller diameter pipes than may be supported by the clevis hanger 20. In the embodiment illustrated, a flange 222 surrounding a top hole 224 of the clevis top 216 extends the same height above a central region 226 of the clevis top 216 as do the flanges 212 and 214. This may be useful, for example, in order to allow a nut (not shown) to seat firmly on the flange 222, without interference from the flanges 212 and 214, in order to hang the clevis hanger 190 from a threaded rod or similar hanging support.

Thus, embodiments of the disclosed clevis hanger system (e.g., the clevis hanger 20 and the pipe shield 160, the clevis hanger 190, or the clevis hanger 210) can provide various benefits compared to conventional hanger systems. For example, in some embodiments, through the use of one or more threaded holes, the disclosed hanger system can be assembled and installed with reduced hardware requirements relative to conventional systems. In some embodiments, through the use of flanges (e.g., extruded annular flanges at bolt holes, or extruded flanges at slots in clevis saddles), the disclosed hanger system can exhibit increased strength relative to conventional systems with similar material thickness, and, correspondingly, can require less overall material and can be less likely to deform or fail under substantial loading. In some embodiments, through the use of appropriate engagement members (e.g., hooks and bendable tabs), the disclosed hanger system can allow for attachment of a pipe shield to a hanger body without requiring separate hardware, or welding, riveting, or similar processes.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A clevis hanger system for hanging a pipe from a hanging support, the clevis hanger system comprising:
 a clevis top including a hanging portion, a first leg with a first hole that is surrounded by a first annular flange, and a second leg with a second hole that is surrounded by a second annular flange; and
 a clevis bottom including a saddle, a third leg with a third hole that is surrounded by a third annular flange, and a fourth leg with a fourth hole that is surrounded by a fourth annular flange;
 the clevis top being secured to the clevis bottom to define an internal area to receive the pipe with:
  the first hole aligned with the third hole, and the first annular flange extending in an opposite direction than the third annular flange, relative to the internal area;
  the second hole aligned with the fourth hole, and the second annular flange extending in an opposite direction than the fourth annular flange, relative to the internal area; and
  a fastener received through the first, second, third, and fourth holes and through the first, second, third, and fourth annular flanges;
 a bottom portion of the saddle including an elongate slot open to the internal area and extending from the internal area to an exterior surface of the saddle; and
 the elongate slot being at least partly surrounded by at least one elongate-slot flange extending outwardly from the elongate slot away from the internal area.

2. The clevis hanger system of claim 1, wherein one of the first annular flange and the third annular flange extends outwardly relative to the internal area and includes an internal thread; and
 wherein the fastener is threaded fastener that engages the internal thread to secure the clevis top to the clevis bottom.

3. The clevis hanger system of claim 2, wherein, at the first hole, the first leg is disposed inwardly of the third leg, relative to the internal area;
 wherein the third annular flange extends outwardly relative to the internal area and includes the internal thread;
 wherein, at the second hole, the second leg is disposed inwardly of the fourth leg, relative to the internal area; and
 wherein the fourth annular flange extends outwardly relative to the internal area.

4. The clevis hanger system of claim 1, further comprising:
 a spacer extending across the internal area between the first leg and the second leg.

5. The clevis hanger system of claim 4, wherein the first leg includes a first slot;
 wherein the second leg includes a second slot;
 wherein a first end of the spacer includes a first flat tab that extends into the first slot to attach the spacer to the first leg; and
 wherein a second end of the spacer includes a second flat tab that extends into the second slot to attach the spacer to the second leg.

6. The clevis hanger system of claim 1, wherein the hanging portion of the clevis top includes a fifth hole to attach the clevis top to the hanging support; and
 wherein a fifth annular flange surrounds the fifth hole and extends upwardly from the fifth hole away from the internal area.

7. The clevis hanger system of claim 1, wherein the clevis top includes a first at least one flange extending outwardly away from the internal area along a first side of the clevis top, and a second at least one flange extending outwardly away from the internal area along a second side of the clevis top; and
 wherein the clevis bottom includes a third at least one flange extending outwardly away from the internal area along a first side of the clevis bottom, and a fourth at least one flange extending outwardly away from the internal area along a second side of the clevis bottom.

8. The clevis hanger system of claim 1, further comprising:
a pipe shield including a shield body and at least one of a hook extending away from the shield body and a bendable tab extending away from the shield body;
wherein the at least one of the hook and the bendable tab extend through the elongate slot to secure the pipe shield to the clevis bottom.

9. The clevis hanger system of claim 8, wherein the hook is a first hook;
wherein the pipe shield includes the first hook, the bendable tab, and a second hook;
wherein the first hook, the second hook, and the bendable tab extend through the elongate slot to secure the pipe shield to the clevis bottom;
wherein each of a first hooked portion of the first hook and a second hooked portion of the second hook curves in a first direction to engage at least one elongate-slot flange that at least partly surrounds the elongate slot; and
wherein the bendable tab is plastically bent in a second direction into contact with the clevis bottom to secure the pipe shield to the clevis bottom, the second direction being different from the first direction.

10. A hanger system for hanging a pipe, the hanger system comprising:
a hanger body at least partly defining an internal area to receive the pipe, the hanger body including a saddle with an internal wall facing the internal area and an external wall facing away from the internal area, with a bottom portion of the saddle including an elongate slot that is open to the internal area and extends from the internal area to the external wall of the saddle, and with the elongate slot being at least partly surrounded by at least one elongate-slot flange that extends from the elongate slot at least one of outwardly away from the internal area and inwardly into the internal area; and
a pipe shield configured to support the pipe relative to the saddle, the pipe shield including a shield body, a first hook extending away from the shield body, and a bendable tab extending away from the shield body;
the pipe shield being secured to the saddle with:
the first hook extending through the elongate slot to engage the at least one elongate-slot flange on a first side of the elongate slot; and
the bendable tab extending through the elongate slot and being plastically bent to engage the at least one elongate-slot flange on a second side of the elongate slot that is opposite the first side.

11. The hanger system of claim 10, wherein the hanger body includes a first at least one flange that is spaced apart from the elongate slot and extends outwardly away from the internal area along a first side of the saddle, and a second at least one flange that is spaced apart from the elongate slot and extends outwardly away from the internal area along a second side of the saddle.

12. The hanger system of claim 10, further comprising:
a second hook included on the shield body;
wherein the second hook extends through the elongate slot to secure the pipe shield to the saddle;
wherein each of a first hooked portion of the first hook and a second hooked portion of the second hook curves in a first direction to engage the at least one elongate-slot flange; and
wherein the bendable tab is plastically bent in a second direction to engage the at least one elongate-slot flange, the second direction being different from the first direction.

13. A pipe shield for a hanger system, the hanger system including a hanger body with a saddle, the saddle including an internal hanger surface, an external hanger surface, and at least one opening extending between the internal hanger surface and the external hanger surface, the pipe shield comprising:
a shield body including an interior shield surface and an exterior shield surface, the exterior shield surface being opposite the interior shield surface on the shield body and configured to seat on the internal hanger surface of the hanger body; and
a first hook and a tab, each extending outwardly from the exterior shield surface and being configured to extend through the at least one opening to engage the external hanger surface to secure the shield body to the hanger body;
the tab including an end portion and a neck portion, the neck portion extending between the shield body and the end portion and being narrower in a first dimension than the end portion; and
the tab being configured to be plastically bent at the neck portion to bring the end portion into engagement with the external hanger surface.

14. The pipe shield of claim 13, further comprising:
a second hook that extends outwardly from the exterior shield surface and is configured to extend through the at least one opening to engage the external hanger surface to secure the shield body to the hanger body;
wherein each of a first hooked portion of the first hook and a second hooked portion of the second hook curves in a first direction to engage the external hanger surface; and
wherein the tab is configured to be plastically bent in a second direction to engage the external hanger surface, the second direction being different from the first direction.

* * * * *